United States Patent [19]

Suginoya et al.

[11] Patent Number: 4,779,957
[45] Date of Patent: Oct. 25, 1988

[54] COLORED LIQUID CRYSTAL ELECTRO-OPTICAL DEVICE HAVING A BUFFER LAYER AND METHOD FOR MANUFACTURING THE SAME

[75] Inventors: Mitsuru Suginoya; Hitoshi Kamamori; Yumiko Terada, all of Tokyo, Japan

[73] Assignee: Seiko Instruments & Electronics Ltd., Tokyo, Japan

[21] Appl. No.: 8,289

[22] Filed: Jan. 29, 1987

[30] Foreign Application Priority Data

Mar. 20, 1986 [JP] Japan .................................. 61-62390

[51] Int. Cl.$^4$ ................................................ G02F 1/13
[52] U.S. Cl. ............................. 350/339 R; 350/339 F; 350/341
[58] Field of Search ................ 350/339 R, 339 F, 341

[56] References Cited

U.S. PATENT DOCUMENTS 4,068,923 1/1978 Toida ........................ 350/339 R X
4,639,088 1/1987 Suginoya et al. ............... 350/339 F

FOREIGN PATENT DOCUMENTS 57-32417 2/1982 Japan ............................... 350/339 R Primary Examiner—Stanley D. Miller
Assistant Examiner—Richard Gallivan
Attorney, Agent, or Firm—Bruce L. Adams; Van C. Wilks

[57] ABSTRACT

A liquid crystal optical device is comprised of a pair of substrates having respective inner major surfaces spaced apart from one another and a liquid crystal layer composed of liquid crystal molecules and interposed between the spaced inner major surfaces. An electrode layer is disposed on at least one of the inner major surfaces. An organic filter layer colored in a given color tone is electrodeposited on the electrode layer. An organic alignment layer is disposed on the filter layer in contact with the liquid crystal layer for aligning the liquid crystal molecules. An organic protective layer is interposed between the alignment layer and filter layer for adhesively securing the alignment layer to the filter layer to protect the alignment layer from stress applied thereto relative to the filter layer.

28 Claims, 1 Drawing Sheet

COLORED LIQUID CRYSTAL ELECTRO-OPTICAL DEVICE HAVING A BUFFER LAYER AND METHOD FOR MANUFACTURING THE SAME

BACKGROUND OF THE INVENTION

The present invention relates to a colored liquid crystal electro-optical device, e.g., a display device, using color filters produced by electrodeposition or the else and a method for manufacturing the same. The invention aims to improve the orientation reliability (particularly, when the display is left standing at high temperature) of the color filters by providing a protective layer on the color filters and further providing an orientation layer on the protective layer.

FIG. 2 of the accompanying drawings illustrates an example of multicolored liquid crystal displays using electrodeposited color filters. In the drawing, reference numeral 10 represents a transparent substrate made of glass, 11 is an electrode composed of a transparent conductive film having the pattern of an arbitrary figure or character and 12 is a color filter formed by electrodeposition of an electrodepositable polymer and a pigment. The pattern of the color filters is in alignment with the electrodes 11, and the color filters 12 are colored in a plurality of desired color tones.

A method of producing color filters by electrodeposition is disclosed in the U.S. Pat. No. 4,522,691. This method affords an effective means capable of easily producing high precision color filters. Reference numeral 13 in the drawing represents an orientation film formed by printing, spin-coating or dipping a polyimide solution, 14 is another transparent electrode and 15 is another transparent substrate. A liquid crystal 16 is sandwiched between the two substrates 10 and 15 to form a liquid crystal cell. When a voltage is applied to the liquid crystal cell and the cell is then observed while being interposed between a polarizer and an analyzer, the colors of the color filters can be observed from the portions of the liquid crystal cell which are in a transmission mode, and a black color can be observed at the other portions which do not permit the transmission of light. Namely, the device is a multicolored liquid crystal display for displacing the colors of the color filters by the use of the liquid crystal as an optical shutter.

Conventionally, polyimide having its surface rubbed with a cloth or the like in a predetermined direction has been known, and has been used as a material of an orientation film for orienting the liquid crystal molecules. Polyester-melamine resins, acryl-melamine resins, and the like have also been disclosed as the materials of the electrodeposited color filters. When the polyimide film is formed on the color filter consisting of the synthetic polymer surface, polyimide itself has low adhesion to the filter. In addition, thermo-physical behaviour of the polyimide is different from that of the filter material. For these reasons, stress imposed to the interface between the polyimide and the filter is likely to be great, so that the reliability of orienting ability of the polyimide orientation film is extremely reduced, and the orienting ability is lost within about 100 hours when the film is left standing at 80° C.

SUMMARY OF THE INVENTION

It is therefore an object of the invention to provide an improved colored liquid crystal electro-optical device. Another object of the invention is to provide a colored liquid crystal electro-optical device having reliable orientation characteristics.

A further object of the invention is to provide a colored liquid crystal electro-optical device using electrodeposited color filters having high adhesion and high orientation characteristics.

A furthermore object of the invention is to provide a method for manufacturing such an electro-optical device.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION OF THE INVENTION

Although the mechanism of the degradation of the orienting ability of orientation films has not been sufficiently clarified, the following mechanism may be assumed. One is the peeling of the orientation film from the substrate and the peeled portion cannot exert any orienting power to the liquid crystal molecules so that the orientation or alignments of the liquid crystal molecules gets disturbed. Another is the case where the energy imparting directivity to the surface of the orientation or alignment film that is provided by rubbing or the like cannot be retained due to subsequent thermal energy or the like and is offset by the subsequent energy. More definitely, the directivity is lost if the rearrangement of the molecules or the surface shape such as phase transition or melting occors due to the thermal energy. If such a degradation mechanism is observed in the orientation film provided on the color filter, one of the causes relates to adhesion between the orientation film and the color filter and the other cause is the stress between them.

Although it is not clear which of the above two causes dominates the mechanism of degradation of the orienting ability in the actual electrodeposited filter, the inventor of the present invention has found a method of providing a protective film on the electrodeposited filter, which protective film has high adhesion to both the color filter and the orientation film, as effective means for eliminating either of these causes. As a result of intensive studies, the present inventor has also found that a polymer containing an epoxy group and a silane coupling agent are effective as the material of the protective layer.

The present invention will now be described in further detail with reference to embodiments thereof and comparative examples.

EXAMPLE 1

Figure 1:
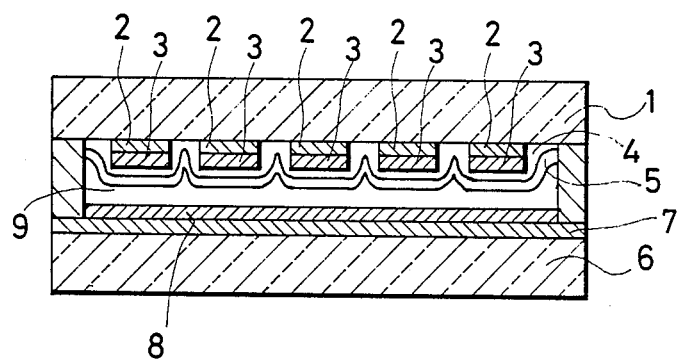
FIG. 1 is a longitudinal sectional view of a particular example of a multicolored liquid crystal display in accordance with the present invention.
Figure 2:
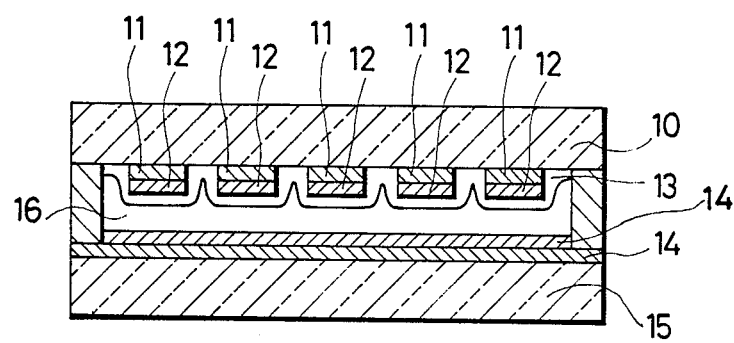
FIG. 2 is a longitudinal sectional view of a multicolored liquid crystal display utilizing an electrodeposited color filter.

FIG. 1 depicts an example of the multicolored liquid crystal display produced in accordance with the production method of the present invention.

An electrode layer in the form of a plurality of transparent electrodes 2 made of tin oxide were patterned and formed on an inner major surface of a transparent glass substrate 1. This substrate was immersed in an electrodeposition solution having the following composition. Among the transparent electrodes, a positive voltage was applied to a group of the electrodes which was to be colored in red tone, while a negative electrode was applied to an opposed electrode to effect the electrodeposition. After the substrate was pulled out of the solution and washed with water, it was cured at 200° C. for about 30 minutes to form a red filter layer on the group of the electrodes.

| electrodeposition solution | |
|---|---|
| polyester resin | 6.5 parts |
| melamine resin | 1.5 parts |
| ethyl cellosolve | 2.0 parts |
| water | 88.0 parts |
| red pigment | 2.0 parts |

Other electrodeposition solutions were prepared by replacing the red pigment described above by a green pigment and a blue pigment, respectively, and green and blue filters were likewise formed sequentially on different groups of the electrodes. Thus, there was obtained a multicolored filter layer 3 of red, green and blue tones. A film was coated by spin coating on this filter layer from a solution having the following composition and was heated and cured at 200° C. for one hour to obtain a protective layer 4.

| polyamide resin | 2.5 parts |
|---|---|
| epoxy resin ("Shell Epikote #1002) | 2.5 parts |
| xylenol | 95.0 parts |

This protective layer 4 was coated with a 10 wt. % cyclohexanone solution of a polyimide of the following formula by spin coating:

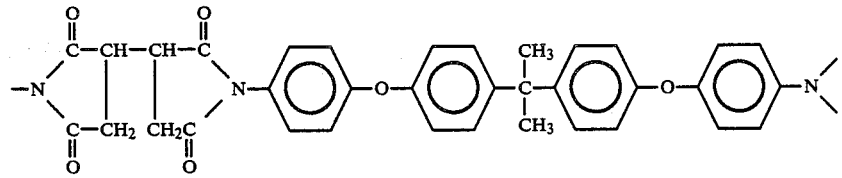

Baking was carried out at 200° C. for one hour, and the surface was rubbed with a cotton cloth in a predetermined direction for rubbing treatment to obtain an orientation layer 5. Thereafter, a second transparent electrode 7 was disposed on a second glass substrate 6 and another orientation film 8 was formed on the electrode 7 and rubbed similarly. This substrate 6 was bonded to the opposed substrate 1 and a liquid crystal 9 was filled between them to prepare a multicolored liquid crystal display. When the obtained display was left standing at a high temperature of 80° C., the orientation state remained excellent even after the passage of 1,000 hours and degradation of orientation could hardly be observed.

COMPARATIVE EXAMPLE 1

A multicolored liquid crystal display was produced in the same manner as in Example 1 except that the composition of the protective layer coating solution was changed as follows:

| polyamide resin | 2.5 parts |
|---|---|
| benzoguanamine resin | 2.5 parts |
| xylene | 95.0 parts |

When the resulting multicolored liquid crystal display was left standing at a high temperature of 80° C., orientation almost disappeared after the passage of 300 hours.

COMPARATIVE EXAMPLE 2

A multicolored liquid display was produced in the same way as in Example 1 except that the protective layer of Example 1 was not used. When the obtained display was left standing at a high temperature of 80° C., orientation almost disappeared after the passage of 250 hours.

EXAMPLE 2

A film of the protective layer was formed by spin coating of a 10 wt. % ethyl cellosolve acetate solution of an epoxy modified acrylic resin and baking at 200° C. for one hour. Thereafter, the same steps were employed as those of Example 1 to produce a multicolored liquid crystal display, and substantially the similar effect was obtained as in Example 1.

EXAMPLE 3

A film of the protective layer was formed by spin coating of a 10 wt. % ethyl cellosolve solution of an isocyanate-modified epoxy resin and baking at 200° C. for one hour. Thereafter, the same steps were employed as those of Example 1 to produce a multicolored liquid crystal display, and substantially the similar effect was obtained as in Example 1.

EXAMPLE 4

A film of the protective layer was formed by spin coating of a solution having the composition tabulated below and baking at 150° C. for one hour.

| methyltriethoxysilane | 0.5 parts |
|---|---|
| acrylic resin | 9.5 parts |
| ethyl cellosolve | 90.0 parts |

Thereafter, a multicolored liquid display was produced in the same way as in Example 1 and substantially the similar effect was obtained as in Example 1.

EXAMPLE 5

A film of the protective layer was formed by spin coating of a solution having the composition tabulated below and baking at 150° C. for one hour.

| epoxy resin | 2.5 parts |
|---|---|

| | |
|---|---|
| (Shell Epikote #1002) | |
| phenolic resin | 2.5 parts |
| xylenol | 95.0 parts |

Thereafter, a multicolored liquid display was produced in the same way as in Example 1 and substantially the similar effect was obtained as in Example 1.

EXAMPLE 6

Transparent electrodes 2 made of tin oxide were patterned and formed on a transparent glass substrate 1. This substrate was immersed in an electrodeposition solution having the following composition. Among the transparent electrodes, a positive voltage was applied to a group of the electrodes which was to be colored in red tone, while a negative electrode was applied to an opposed electrode. After the substrate was pulled out of the solution and washed with water, it was cured at 200° C. for about 30 minutes to form a red filter layer.

| electrodeposition solution | |
|---|---|
| acrylic resin | 6.5 parts |
| melamine resin | 1.5 parts |
| ethyl cellosolve | 2.0 parts |
| water | 88.0 parts |
| red pigment | 2.0 parts |

Other electrodeposition solutions were prepared by replacing the red pigment described above by a green pigment and a blue pigment, respectively, and green and blue filters were likewise formed sequentially. Thus, there was obtained a multicolored filter 3 of red, green, and blue tones. A film was coated by spin coating on this filter layer from each of solutions having the composition described in Examples 1 to 5 and was heated and cured at 200° C. for one hour to obtain a protective layer 4.

Thereafter, the same steps were employed as those of Example 1 to produce a multicolored liquid crystal display, and substantially the similar effect was obtained as in Examples 1 to 5.

As described precisely in the foregoing embodiments, according to the present invention disposes, the protective layer is disposed on the color filter layer produced by electrodeposition, and further the orientation layer is disposed on the protective layer. Thus, the present invention can provide a multicolored liquid crystal electro-optical device having extremely high reliability and long service life.

As described above, the present invention can provide such excellent effects, but it is not possible to determine clearly whether the effects result from good adhesion between the filter and the orientation film or from the buffer capacity of the protective layer. In fact, the effects may presumably result from the combined effect of both of them in view of the fact that the protective layer containing the epoxy or silane coupling agent which provides a good effect in the examples has relatively high adhesion with the filter layer or polyamide layer and has excellent physico-chemical durability.

What is claimed is:

1. An electro-optical device comprising: a pair of electrodes; an electrodeposited organic color filter on at least one of the electrodes; an orientation layer disposed on the electrodeposited color filter; and an organic protective layer sandwiched between the color filter and orientation layer and having high adhesion characteristics to both of the color filter and orientation layer and buffer capacity of mitigating stress imposed upon the interface between the color filter and orientation layer.

2. An electro-optical device as claimed in claim 1; wherein the organic color filter is formed by electrodeposition using a solution containing an electrodepositable polymer and pigments dispersed in the solution.

3. An electro-optical device as claimed in claim 2; wherein the electrodepositable polymer contains a polyester resin and a melamine resin.

4. An electro-optical device as claimed in claim 2; wherein the electrodepositable polymer contains an acryl resin and a malamine resin.

5. An electro-optical device as claimed in claim 1; wherein the organic protective layer comprises a polymer containing an epoxy group.

6. An electro-optical device as claimed in claim 1; wherein the organic protective layer comprises a polymer containing a silane coupling agent.

7. An electro-optical device as claimed in claim 1; wherein the organic protective layer comprises a polymer containing a polyamide resin.

8. An electro-optical device as claimed in claim 1; wherein the organic protective layer comprises a polymer containing an acrylic resin.

9. An electro-optical device as claimed in claim 1; wherein the organic protective layer comprises a polymer containing a polyurethane resin.

10. An electro-optical device as claimed in claim 1; wherein the organic protective layer comprises a polymer containing a phenolic resin.

11. An electro-optical device as claimed in claim 1; wherein the orientation layer comprises at least a polymer selected from the group consisting of polyimide, polyamide and cellulosis polymers.

12. A multicolored liquid crystal electro-optical device comprising: a pair of electrodes at least one of which has plural separate conductive films; a color filter having plural different color layers each of which is formed on a different one of the conductive film, respectively; an orientation layer disposed on the color filter; and a protective layer sandwiched between the color filter and orientation layer.

13. A multicolored liquid crystal electro-optical device as claimed in claim 12; wherein the color filter is formed by electrodeposition using a solution containing an electrodepositable polymer and pigments dispersed in the solution.

14. A method for manufacturing a colored liquid crystal electro-optical device comprising the steps of: forming an electrode on each of a pair of substrates; forming a color filter on the electrode of at least one of the substrates by electrodeposition; forming a protective layer on the electrodeposited color filter; and superposing an orientation layer on the protective layer.

15. A method for manufacturing a colored liquid crystal electro-optical device as claimed in claim 14; wherein the color filter is formed by electrodeposition using a solution containing an electrodepositable polymer and pigments dispersed in the solution.

16. A method for manufacturing a colored liquid crystal electro-optical device comprising the steps of: forming an electrode on each of a pair of substrates, at least one electrode having plural separate conductive films; forming a color filter having plural different color layers on the plural separate conductive films by electrodeposition using a solution containing an electrodepositable polymer and pigments dispersed in the solution; forming an organic protective layer on the electrodeposited color filter; and superposing an orientation layer on the organic protective layer, the protective layer having high adhesion characteristics to both of the electrodeposited color filter and orientation layer and having buffer capacity of mitigating stress imposed upon the interface between the color filter and orientation layer.

17. A method for manufacturing a colored liquid crystal electro-optical device as claimed in claim 16; wherein the electrodepositable polymer contains a polyester resin and a melamine resin.

18. A method for manufacturing a colored liquid crystal electro-optical device as claimed in claim 16; wherein the electrodepositable polymer contains an acryl resin and a melamine resin.

19. A method for manufacturing a colored liquid crystal electro-optical device as claimed in claim 16; wherein the organic protective layer comprises a polymer consisting of an epoxy group, a silane coupling agent, a polyamide resin, an acrylic resin, a polyurethane resin and a phenolic resin.

20. A liquid crystal optical device comprising: a pair of substrates having respective inner major surfaces spaced apart from one another; a liquid crystal layer composed of liquid crystal molecules and interposed between the spaced inner major surfaces; an electrode layer disposed on at least one of the inner major surfaces; a filter layer colored in a given color tone and electrodeposited on the electrode layer; an alignment layer disposed on the filter layer in contact with the liquid crystal layer for aligning the liquid crystal molecules; and a protective layer interposed between the alignment layer and filter layer for adhesively securing the alignment layer to the filter layer to protect the alignment layer from stress applied thereto relative to the filter layer.

21. A liquid crystal optical device as claimed in claim 20; wherein the filter layer comprises an organic material composed of an electrodepositable polymer and a coloring matter.

22. A liquid crystal optical device as claimed in claim 21; wherein the electrodepositable polymer comprises a resin selected from the group consisting of a polyester resin, a melamine resin and an acrylic resin.

23. A liquid crystal optical device as claimed in claim 21; wherein the alignment layer comprises an organic material composed of a polymer.

24. A liquid crystal optical device as claimed in claim 23; wherein the polymer is selected from the group consisting of a polyimide, a polyamide and a cellulosis.

25. A liquid crystal optical device as claimed in claim 23; wherein the protective layer comprises an organic material composed of a polymer.

26. A liquid crystal optical device as claimed in claim 25; wherein the polymer is composed of a resin selected from the group consisting of an epoxy resin, a polyamide resin, an acrylic resin, a polyurethane resin and a phenolic resin.

27. A liquid crystal optical device as claimed in claim 25; wherein the organic material contains a silane coupling agent.

28. A liquid crystal optical device as claimed in claim 20; wherein the electrode layer comprises a plurality of separate sections, and the filter layer comprises a plurality of corresponding separate portions colored in different color tones and electrodeposited on the respective ones of the electrode layer sections.

* * * * *